United States Patent Office 3,000,915
Patented Sept. 19, 1961

3,000,915
9α-HALO-21-ALKANE SULFONATES OF THE PREGNANE SERIES AND PROCESS THEREFOR
Josef E. Herz and Josef Fried, New Brunswick, N.J., assignors to Olin Mathieson Chemical Corporation, New York, N.Y., a corporation of Virginia
No Drawing. Filed June 17, 1955, Ser. No. 516,333
16 Claims. (Cl. 260—397.45)

This invention relates to the synthesis of valuable steroids; and has for its objects the provision of (I) an advantageous process of preparing steroids of the pregnane (including the pregnene, pregnadiene, and allopregnane) series, unsubstituted in the 21-position, and having a 9α-fluoro or chloro (i.e. a halogen of atomic weight greater than 18 and less than 36) and an 11β-hydroxy (or 11-keto) substituent; (II) certain 21-alkanesulfonyloxy and 21-iodo compounds useful as intermediates in the preparation of these steroids; and (III) certain physiologically active steroids which are new and useful in themselves.

The process of this invention essentially comprises: (a) converting a 21-hydroxy steroid of the pregnane series, having a 9α-fluoro (or chloro) and an 11β-hydroxy (or 11-keto) substituent, into the corresponding 21-alkanesulfonyloxy-derivative thereof; and (b) converting the latter into the corresponding 21-unsubstituted derivative, either directly or through the 21-iodide derivative.

The novel compounds of this invention comprise: (A) 21-alkanesulfonyloxy-9α-halo-11β-hydroxy (or 11-keto)-steroids of the pregnane series; and (B) 21-iodo-9α-halo-11β-hydroxy (or 11-keto)-steroids of the pregnane series; wherein, in each instance, the halogen has an atomic weight greater than 18 and less than 36 (i.e. fluoro or chloro).

The preferred compounds preparable by the process of this invention are those which are comprehended by the general formula:

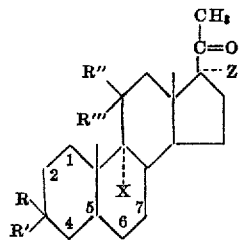

wherein at least one of the positions 1,2; 4,5; and 6,7 is double-bonded, and wherein R is hydrogen, R' is hydroxy or together R and R' is a keto or ketalized keto group (preferably the free keto group), R'' is hydrogen, R''' is β-hydroxy, or together R'' and R''' is a keto group, X is an α-fluoro or α-chloro group, and Z is hydrogen or α-hydroxy.

Representative steroids preparable by the process of this invention include:

9α-fluoro-11β,17α-dihydroxyprogesterone;
9α-chloro-11β,17α-dihydroxyprogesterone;
9α-fluoro-11-keto-17α-hydroxyprogesterone;
9α-chloro-11-keto-17α-hydroxyprogesterone;
9α-fluoro-11β-hydroxyprogesterone;
9α-chloro-11β-hydroxyprogesterone;
9α-fluoro-11-ketoprogesterone;
9α-chloro-11-ketoprogesterone;
9α-fluoro-Δ¹-allopregnene-11β,17α-diol-3,20-dione;
9α-chloro-Δ¹-allopregnene-11β,17α-diol-3,20-dione;
9α-fluoro-Δ¹-allopregnene-17α-ol-3,11,20-trione;
9α-chloro-Δ¹-allopregnene-17α-ol-3,11,20-trione;
9α-fluoro-Δ¹-allopregnene-11β-ol-3,20-dione;
9α-chloro-Δ¹-allopregnene-11β-ol-3,20-dione;
9α-fluoro-Δ¹-allopregnene-3,11,20-trione;
9α-chloro-Δ¹-allopregnene-3,11,20-trione;
9α-fluoro-Δ¹,⁴-pregnadiene-11β,17α-diol-3,20-dione;
9α-chloro-Δ¹,⁴-pregnadiene-11β,17α-diol-3,20-dione;
9α-fluoro-Δ¹,⁴-pregnadiene-17α-ol-3,11,20-trione;
9α-chloro-Δ¹,⁴-pregnadiene-17α-ol-3,11,20-trione;
9α-fluoro-Δ¹,⁴-pregnadiene-11β-ol-3,20-dione;
9α-chloro-Δ¹,⁴-pregnadiene-11β-ol-3,20-dione;
9α-fluoro-Δ¹,⁴-pregnadiene-3,11,20-trione;
9α-chloro-Δ¹,⁴-pregnadiene-3,11,20-trione;
9α-fluoro-Δ⁴,⁶-pregnadiene-11β,17α-diol-3,20-dione;
9α-chloro-Δ⁴,⁶-pregnadiene-11β,17α-diol-3,20-dione;
9α-fluoro-Δ⁴,⁶-pregnadiene-17α-ol-3,11,20-trione;
9α-chloro-Δ⁴,⁶-pregnadiene-17α-ol-3,11,20-trione;
9α-fluoro-Δ⁴,⁶-pregnadiene-11β-ol-3,20-dione;
9α-chloro-Δ⁴,⁶-pregnadiene-11β-ol-3,20-dione;
9α-fluoro-Δ⁴,⁶-pregnadiene-3,11,20-trione; and
9α-chloro-Δ⁴,⁶-pregnadiene-3,11,20-trione.

To prepare these 9α-halo compounds, a steroid of the general formula

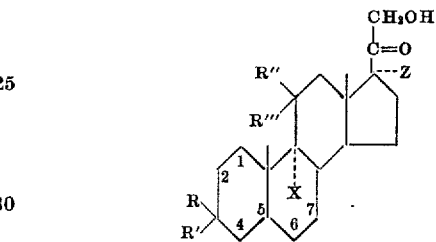

wherein at least one of the positions 1,2; 4,5; and 6,7 is double-bonded and R, R', R'', R''', X, and Z are as above-defined, is reacted with an alkanesulfonyl halide. Representative steroids suitable as initial reactants in the process of this invention are disclosed in U.S. applications, Serial No. 489,769, filed February 21, 1955, and Serial No. 417,489, filed March 10, 1954, now U.S. Patent No. 2,852,511, by Josef Fried, and include:

9α-fluoro-hydrocortisone;
9α-chlorohydrocortisone;
9α-fluorocortisone;
9α-chlorocortisone;
9α-fluorocorticosterone;
9α-chlorocorticosterone;
9α-fluoro-11-dehydrocorticosterone;
9α-chloro-11-dehydrocorticosterone;
9α-fluoro-Δ¹-allopregnene-11β,17α,21-triol-3,20-dione;
9α-chloro-Δ¹-allopregnene-11β,17α,21-triol-3,20-dione;
9α-fluoro-Δ¹-allopregnene-17α,21-diol-3,11,20-trione;
9α-chloro-Δ¹-allopregnene-17α,21-diol-3,11,20-trione;
9α-fluoro-Δ¹-allopregnene-11β,21-diol-3,20-dione;
9α-chloro-Δ¹-allopregnene-11β,21-diol-3,20-dione;
9α-fluoro-Δ¹-allopregnene-21-ol-3,11,20-trione;
9α-chloro-Δ¹-allopregnene-21-ol-3,11,20-trione;
9α-fluoro-Δ¹,⁴-pregnadiene-11β,17α,21-triol-3,20-dione;
9α-chloro-Δ¹,⁴-pregnadiene-11β,17α,21-triol-3,20-dione;
9α-fluoro-Δ¹,⁴-pregnadiene-17α,21-diol-3,11,20-trione;
9α-chloro-Δ¹,⁴-pregnadiene-17α,21-diol-3,11,20-trione;
9α-fluoro-Δ¹,⁴-pregnadiene-11β,21-diol-3,20-dione;
9α-chloro-Δ¹,⁴-pregnadiene-11β,21-diol-3,20-dione;
9α-fluoro-Δ¹,⁴-pregnadiene-21-ol-3,11,20-trione;
9α-chloro-Δ¹,⁴-pregnadiene-21-ol-3,11,20-trione;
9α-fluoro-Δ⁴,⁶-pregnadiene-11β,17α,21-triol-3,20-dione;
9α-chloro-Δ⁴,⁶-pregnadiene-11β,17α,21-triol-3,20-dione;
9α-fluoro-Δ⁴,⁶-pregnadiene-17α,21-diol-3,11,20-trione;
9α-chloro-Δ⁴,⁶-pregnadiene-17α,21-diol-3,11,20-trione;
9α-fluoro-Δ⁴,⁶-pregnadiene-11β,21-diol-3,20-dione;
9α-chloro-Δ⁴,⁶-pregnadiene-11β,21-diol-3,20-dione;
9α-fluoro-Δ⁴,⁶-pregnadiene-21-ol-3,11,20-trione; and
9α-chloro-Δ⁴,⁶-pregnadiene-21-ol-3,11,20-trione.

These steroids are reacted with an alkanesulfonyl halide (sulfonyl chlorides are preferred, but other halides such as bromides and iodides may be used). Although any alkanesulfonyl chloride may be used, the alkane group is preferably a lower alkane, methanesulfonyl chloride (mesyl chloride) being particularly preferred. The reaction is carried out by intermixing the steroid and sulfonyl halide under substantially anhydrous conditions and preferably in the cold (e.g. at a temperature less than about 20° C.), in the presence of pyridine or other organic base.

The reaction results in the production of new intermediate steroids containing in the 21-position an alkanesulfonyloxy radical, which corresponds to the alkanesulfonyl halide used in the reaction. The preferred intermediate 21-alkanesulfonyloxy compounds of this invention are those of the following general formula

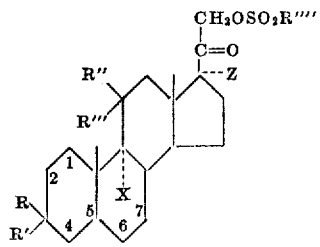

wherein at least one of the positions 1,2; 4,5; and 6,7 is double-bonded, and wherein R'''' is alkyl (preferably lower alkyl), and R, R', R'', R''', X and Z are as hereinbefore defined.

These 21-alkanesulfonyloxy intermediates are then reacted with a metal iodide (such as an alkali metal iodide, and particularly sodium iodide) in an organic solvent. The reaction is preferably, but not necessarily, conducted at an elevated temperature (e.g. at reflux). The nature of the product will depend on the organic solvent selected. If an acidic solvent, such as a lower alkanoic acid (particularly glacial acetic acid) is chosen, the 21-unsubstituted final products of this invention are obtained directly. If, however, a neutral solvent such as an alcohol or a ketone (particularly acetone) is selected, then the 21-iodated intermediates of this invention are produced. The preferred 21-iodo compounds of this invention are those of the general formula

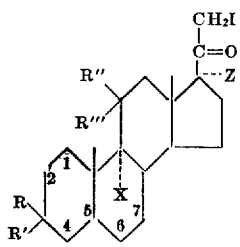

wherein at least one of the positions 1,2; 4,5; and 6,7 is double-bonded, and wherein R, R', R'', R''', X and Z are as hereinbefore defined.

These 21-iodo intermediates can then be converted to their 21-unsubstituted derivatives, either in situ or in a second step by reacting (preferably by heating) the former with an alkali metal iodide in an acidic solvent or with a metal bisulfite (such as an alkali metal bisulfite, particularly sodium bisulfite) in an inert solvent, such as an aqueous organic solvent (e.g. water-dioxane), or with an electropositive reducing metal (such as zinc dust) in an acidic solvent to prepare the final products of this invention.

The steroids of the pregnane (including the pregnene, pregnadiene, and allopregnene) series of this invention, which are unsubstituted in the 21-position, and have a 9α-fluoro (or chloro) group and an 11β-hydroxy (or 11-keto) group are physiologically active compounds, which possess glucocorticoid as well as mineralocorticoid activity. Thus, the new steroids of this invention can be administered instead of, and in the same manner as, cortisone of hydrocortisone in the treatment of rheumatoid arthritis and dermatomyositis, or in the same manner as desoxycorticosterone in the treatment of Addison's disease or adrenal insufficiencies. In the latter instance, it is especially advantageous since the compounds can be administered perorally, whereas desoxycorticosterone has to be given by injection. The dosage for such administration is, of course, dependent on the relative activity of the compound.

The following examples are illustrative of the invention (all temperatures being in centigrade). The first four examples are directed to processes for preparing the 21-alkanesulfonyloxy intermediates of this invention:

EXAMPLE 1

*9α-fluorohydrocortisone 21-mesylate*

To a solution of 4 g. of 9α-fluorohydrocortisone in 50 ml. of anhydrous pyridine is added at 0° with stirring 21.1 ml. of methanesulfonyl chloride. After 3 hours at 0°, 100 ml. of ice water is added which induces rapid crystallization of the mesylate. After short standing at 0° the crystals are filtered off and washed first with a mixture of equal volumes of acetone and water and finally with ice-water, keeping the acetone-water washes separate from the original pyridine-containing mother liquor. The dried crystals weigh about 4 g. equal to approximately 83% of theory and melt at about 228° (dec.). Concentration of the acetone-water washes yields an additional 160 mg., M.P. about 220° (dec.). Recrystallization from ethyl acetate furnishes the pure 9α-fluorohydrocortisone mesylate possessing the following properties, M.P. about 226–227° (dec.); $[\alpha]_D^{23} + 129°$ (c., 0.30 in dioxane);

$\lambda_{max.}^{alc.}$ 238 m$\mu$ ($\epsilon$ =20,800); $\lambda_{max.}^{Nujol}$ 2.82$\mu$ 2.94$\mu$ (OH), 5.77$\mu$ (20-keto), 6.04$\mu$, 6.18$\mu$ ($\Delta^4$-3-ketone).

*Analysis.*—Calcd. for $C_{22}H_{31}O_7FS$ (458.53): C, 57.62; H, 6.82; S, 6.99. Found: C, 57.92; H, 6.80; S, 7.39.

In a similar manner by substituting an equivalent amount of 9α-chlorohydrocortisone, 9α-fluorocorticosterone, 9α-chlorocorticosterone, 9α-fluoro - 11 - dehydrocorticosterone, or 9α-chloro-11-dehydrocorticosterone, for the 9α-fluorohydrocortisone in example, 9α-chlorohydrocortisone 21-mesylate, 9α-fluorocorticosterone 21-mesylate, 9α-chlorocorticosterone 21-mesylate, 9α - fluoro-11-dehydrocorticosterone 21-mesylate, and 9α-chloro-11-dehydrocorticosterone 21-mesylate are prepared, respectively.

Although 9α-fluorocortisone 21-mesylate and 9α-chlorocortisone 21-mesylate may be prepared analogously, by substituting either 9α-fluorocortisone or 9α-chlorocortisone for the 9α-fluorohydrocortisone in the procedure of Example 1, an alternative method for forming these 11-keto derivatives is illustrated by the following example, wherein 9α-fluorohydrocortisone 21-methylate is oxidized with an oxidizing agent, such as a hexavalent chromium compound (e.g. chromic acid) in an organic acid solvent, such as glacial acetic acid, to 9α-fluorocortisone 21-mesylate.

EXAMPLE 2

*9α-fluorocortisone 21-mesylate*

To a solution of 460 mg. of 9α-fluorohydrocortisone 21-mesylate in 20 ml. of glacial acetic acid is added over a period of five minutes a solution of 100 mg. of chromic acid in 5 ml. of acetic acid. After an additional 10 minutes at room temperature ½ ml. of alcohol is added to destroy excess chromium trioxide and the solution concentrated in vacuo to small volume. The residual syrup is distributed between chloroform and water, and the chloroform solution washed with water, dilute sodium bicarbonate solution and again with water. After drying over sodium sulfate the solvent is removed in vacuo and the crystalline residue consisting of 9α-fluorocortisone 21-mesylate recrystallizes from 95% alcohol. The pure compound has a M.P. of about 236–239° (dec.); $[\alpha]_D^{23}$ +134° (c., 0.30 in dioxane);

$\lambda_{max.}^{alc.}$ 234 mμ (ε=18,500); $\lambda_{max.}^{Nujol}$ 2.92μ (OH) 5.79μ (20-keto), 6.02μ, 6.19μ (Δ⁴-3-ketone).

*Analysis.*—Calcd. for $C_{22}H_{29}O_7FS$ (456.51): C, 57.88; H, 6.40; S, 7.02. Found: C, 58.04; H, 6.47; S, 7.08.

EXAMPLE 3

*9α - fluoro - Δ¹,⁴ - pregnadiene-11β,17α,21-triol-3,20-dione 21-mesylate [1,2-dehydro-9α-fluorohydrocortisone 21-mesylate]*

To a solution of 50 mg. of 1,2-dehydro-9α-fluorohydrocortisone acetate in 3 ml. of methanol is added under nitrogen 0.6 ml. of a 10% aqueous potassium carbonate solution, which has been boiled for 1 minute and cooled under nitrogen. After ½ hour at room temperature 0.1 ml. of glacial acetic acid and 2 ml. of water are added and the methanol taken off in vacuo. The crystalline 1,2-dehydro-9α-fluorohydrocortisone is centrifuged off and recrystallized from 95% alcohol. The pure substance has the following properties, M.P. about 274–275° (dec.), $[\alpha]_D^{23}$ +94° (c., 0.29 in 95% alcohol).

To a solution of 34 mg. of 1,2-dehydro-9α-fluorohydrocortisone in 1 ml. of anhydrous pyridine is added at 0° a solution of 0.05 ml. of methanesulfonyl chloride in 0.5 ml. of chloroform. After 2¾ hours at 0°, ice and water are added and the mixture extracted with ethyl acetate. The ethyl acetate extract is washed with dilute sulfuric acid, water, dilute sodium bicarbonate solution and again with water and dried over sodium sulfate. Evaporation of the solvent leaves a crystalline residue which represents essentially pure 1,2-dehydro-9α-fluorohydrocortisone 21-mesylate, M.P. about 218–219° (dec.).

In a similar manner, by substituting 9α-chloro-Δ¹,⁴-pregnadiene-11β,17α,21-triol-3,20-dione 21-acetate, 9α-fluoro-Δ¹,⁴-pregnadiene-11β,21-diol-3,20-dione 21-acetate, or 9α-chloro-Δ¹,⁴-pregnadiene-11β,21-diol-3,20-dione 21-acetate for the 9α-fluoro-Δ¹,⁴-pregnadiene-11β,17α,21-triol-3,20-dione 21-acetate in Example 3, the corresponding 21-mesylates are prepared. The 9α-fluoro-Δ¹,⁴-pregnadiene-11β,17α,21-triol-3,20-dione 21-mesylate of Example 3, or the corresponding 9α-chloro and/or 17α-desoxy derivatives can be oxidized to the corresponding 11-keto derivatives by the method of Example 2, thereby forming 9α-fluoro-Δ¹,⁴-pregnadiene-17α,21-diol-3,11,20-trione 21-mesylate and the analogous 9α-chloro and/or 17α-desoxy derivatives.

EXAMPLE 4

*9α-fluoro-Δ⁴,⁶-pregnadiene-11β,17α,21-triol-3,20-dione 21-mesylate [6,7 - dehydro - 9α - fluorohydrocortisone 21-mesylate]*

To a solution of 250 mg. of 6,7-dehydro-9α-fluorohydrocortisone acetate in 7.5 ml. of methanol is added under nitrogen a solution of 1.2 ml. of a 10% aqueous potassium carbonate solution, which has been boiled for 1 minute and cooled under nitrogen. After 25 minutes at room temperature 0.25 ml. of glacial acetic acid is added to the mixture and the methanol removed in vacuo. The residue is taken up in ethyl acetate, washed with water and the ethyl acetate solution dried over sodium sulfate. Evaporation of the solvent leaves a crystalline residue consisting essentially of 6,7-dehydro-9α-fluorohydrocortisone. After recrystallization from 95% ethanol the substance has the following properties: M.P. about 257–259° (dec.); $[\alpha]_D^{23}$ +101° (c., 0.45 in 95% ethanol);

$\lambda_{max.}^{alc.}$ 281 mμ (ε=25,600); $\lambda_{Max.}^{Nujol}$ 2.95μ (OH) 5.85μ (20-keto), 6.10μ, 6.19μ, 6.31μ (Δ⁴,⁶-3-ketone).

*Analysis.*—Calcd. for $C_{21}H_{27}O_5F$ (378.43): C, 66.65; H, 7.19. Found: C, 66.30; H, 7.00.

To a solution of 175 mg. of 6,7-dehydro-9α-fluorohydrocortisone in 4 ml. of dry pyridine is added at 0° a solution of 0.1 ml. of methanesulfonyl chloride in 1 ml. of chloroform. After 2¾ hours at 0° ice water is added and the mixture extracted with chloroform. Extraction of the chloroform solution with dilute sulfuric acid, water, sodium bicarbonate solution and water followed by evaporation of the chloroform in vacuo furnishes a residue consisting of essentially pure 6,7-dehydro-9α-fluorohydrocortisone 21-mesylate. Recrystallization from 95% ethanol yields the pure mesylate having the following properties: M.P. about 237–238° (dec.); $[\alpha]_D^{23}$ +94° (c., 0.21 in 95% alcohol);

$\lambda_{max.}^{alc.}$ 281 mμ (ε=27,500); $\lambda_{Max.}^{Nujol}$ 285μ 2.98μ (OH), 5.76μ (20-keto), 6.05μ, 6.10μ, 6.18, 6.30μ (Δ⁴,⁶-3-ketone).

*Analysis.*—Calcd. for $C_{22}H_{29}O_7FS$ (456.51): C, 57.78; H, 6.40; S, 7.02. Found: C, 58.19; H, 6.05; S, 7.54.

In a similar manner, by substituting the 21acetoxy derivatives of 9α-chloro-Δ⁴,⁶-pregnadiene-11β,17α-diol-3,20-dione, 9α-fluoro-Δ⁴,⁶-pregnadiene-11β - ol - 3,20-dione, or 9α-chloro-Δ⁴,⁶-pregnadiene-11β-ol-3,20-dione for the 9α-fluoro-Δ⁴,⁶-pregnadiene-11β,17α,21 - triol - 3,20-dione 21-acetate in Example 4, the corresponding 21-mesylates are prepared. These 11β-hydroxy steroids can then be oxidized by the method of Example 2 to the corresponding 11-keto derivatives, yielding 9α-fluoro-Δ⁴,⁶-pregnadiene-17α,21-diol-3,11,20-trione 21-mesylate or the analogous 9α-chloro and/or 17α-desoxy derivatives.

Furthermore, the procedures of Examples 3 and 4 are also operative in the conversion of 9α-fluoro (or chloro)-Δ¹-allopregnene-11β,17α,21 - triol - 3,20-dione 21-acetate and 9α-fluoro (or chloro)-Δ¹-allopregnene-11β,21-diol-3,20-dione 21-acetate to the corresponding 21-mesylate derivative and the subsequent oxidation of the resulting 21-mesylate to the corresponding 11-keto product.

Although the sulfonyl halide employed in each of the processes of Examples 1 through 4 is the methanesulfonyl chloride, other alkanesulfonyl halides, such as the lower alkanesulfonyl chlorides (e.g. ethane-sulfonyl chloride) may be used to yield the corresponding 21-alkanesulfonyloxy (e.g. ethanesulfonyloxy) derivative.

The following four examples are directed to processes for preparing the 21-iodo intermediates of this invention from the corresponding 21-alkanesulfonyloxy intermediates:

EXAMPLE 5

*9α-fluoro-21-iodo-Δ⁴-pregnene-11β,17α-diol-3,20-dione [9α-fluoro-21-iodo-11β,17α-dihydroxyprogesterone]*

A solution of 500 mg. of 9α-fluorohydrocortisone 21-mesylate and 1.5 g. of sodium iodide in 15 ml. of acetone is refluxed for 10 minutes. During the reaction period sodium mesylate precipitates throughout the solution. Hot water is then added until the sodium mesylate is dissolved and the solution is allowed to cool in the refrigerator. The 21-iodide crystallizes in long needles which after one recrystallization from acetone-hexane have the following properties, M. P. ca. 300° (dec.); $[\alpha]_D^{23}$+129° (c., 0.45 in dioxane);

$\lambda_{max.}^{alc.}$ 238 mμ (ε=18,700); $\lambda_{Max.}^{Nujol}$ 2.87μ 3.04μ (OH), 5.88 (20-keto), 6.06μ (Δ⁴-3-ketone).

*Analysis.*—Calcd. for $C_{21}H_{28}O_4FI$ (419.35): C, 51.43; H, 5.76; I, 25.88. Found: C, 51.08; H, 5.75; I, 25.02

In a similar manner by substituting an equivalent amount of the 21-mesylate of 9α-chlorohydrocortisone, 9α-fluorocorticosterone, or 9α-chlorocorticosterone for the 9α-fluorohydrocortisone 21-mesylate in Example 5, 9α-chloro-21-iodo-Δ⁴-pregnene-11β,17α-diol-3,20 - dione, 9α-fluoro- 21-iodo-Δ⁴-pregnene-11β-ol - 3,20 - dione, and 9α-chloro-21-iodo-Δ⁴-pregnene-11β-ol - 3,20 - dione are prepared, respectively

EXAMPLE 6

9α-fluoro -21- iodo -$\Delta^4$- pregnene -17-α-ol- 3,11,20- trione [9α-fluoro-21-iodo-11-keto-17α-hydroxyprogesterone]

A solution of 340 mg. of 9α-fluorocortisone 21-mesylate and 1.5 g. of sodium iodide in 15 ml. of acetone is refluxed for 10 minutes. Hot water is then added to dissolve the precipitated sodium mesylate and the resulting solution is allowed to crystallize at 0°. After recrystallization of the material from acetone-hexane the pure iodo-compound is obtained having the following properties, M.P. ca. 300° (dec.), browning at 150°; $[\alpha]_D^{23}+128°$ (c., 0.35 in chloroform);

$\lambda_{max.}^{alc.}$ 234 mμ (ε = 18,800); $\lambda_{max.}^{Nujol}$ 2.86μ (OH) 5.82μ (20-keto), 6.05μ ($\Delta^4$-3-ketone).

*Analysis.*—Calcd. for $C_{21}H_{26}O_4FI$ (488.34): C, 51.65; H, 5.34; I, 25.99. Found: C, 52.54; H, 5.41; I, 26.15.

Similarly 9α-chloro-21-iodo-$\Delta^4$-pregnene-17α-ol-3,11,20-trione, 9α-fluoro-21-iodo-$\Delta^4$-pregnene-3,11,20-trione, and 9α-chloro-21-iodo-$\Delta^4$-pregnene-3,11,20-trione can be obtained from the 21-mesylates of 9α-chlorocortisone, 9α-fluoro-11-dehydrocorticosterone, and 9α-chloro-11-dehydrocorticosterone, respectively.

These 11-keto derivatives can also be prepared from the corresponding 21-iodo-11β-hydroxy derivatives by oxidation with chromic acid in glacial acetic acid.

EXAMPLE 7

9α-fluoro-21-iodo-$\Delta^{1,4}$-pregnadiene-11β,17α-diol-3,20-dione

A solution of 36 mg. of 1,2-dehydro-9α-fluorohydrocortisone 21-mesylate in 1.5 ml. of acetone and 120 mg. of sodium iodide is refluxed for 10 min. Water is added and the acetone removed in vacuo. The aqueous suspension of the 21-iodo derivative is taken up in ethyl acetate and extracted several times with water. The ethyl acetate solution is dried over sodium sulfate and evaporated to dryness. The residue constitutes essentially pure 9α-fluoro-21-iodo-$\Delta^{1,4}$-pregnadiene-11β,17α-diol-3,20 - dione, M.P. about 180–195° (dec.).

In a similar manner, by substituting the 21-mesyloxy derivatives of 9α-chloro-$\Delta^{1,4}$-pregnadiene - 11α,17α - diol-3,20-dione, 9α-fluoro-$\Delta^{1,4}$-pregnadiene-11β-ol-3,20 - dione, 9α-chloro-$\Delta^{1,4}$-pregnadiene-11β-ol-3,20-dione, 9α - fluoro- $\Delta^{1,4}$-pregnadiene-17α-ol-3,11,20 - trione, 9α - chloro - $\Delta^{1,4}$-pregnadiene-17α-ol-3,11,20-trione, 9α - fluoro - $\Delta^{1,4}$ - pregnadiene-3,11,20-trione, or 9α-chloro - $\Delta^{1,4}$ - pregnadiene-3,11,20-trione for the 21-mesylate of 9α-fluoro-$\Delta^{1,4}$-pregnadiene-11β,17α,21-triol-3,20-dione in Example 7, the corresponding 21-iodo derivatives are formed.

EXAMPLE 8

9α-fluoro-21-iodo-$\Delta^{4,6}$-pregnadiene-11β,17α-diol-3,20-dione

A solution of 190 mg. of 6,7-dehydro-9α-fluoro-hydrocortisone 21-mesylate and 723 mg. of sodium iodide in 7.2 ml. of acetone is refluxed for 10 minutes. The reaction mixture is diluted with water until all the sodium mesylate has dissolved. The solution is allowed to cool slowly. After concentration in vacuo the crystals are filtered and recrystallized from ethanol. Pure 9α-fluoro-21-iodo-$\Delta^{4,6}$-pregnadiene-11β,17α-diol-3,20-dione has the following properties: M.P. about 225° (dec.); $[\alpha]_D^{23}+110°$ (c., 0.33 in absolute alcohol);

$\lambda_{max.}^{Nujol}$ 2.97μ (OH)

5.85μ (20-keto), 6.08μ, 6.18μ, 6.31μ ($\Delta^{4,6}$-3-ketone).

*Analysis.*—Calcd. for $C_{21}H_{26}O_4FI$ (488.34): C, 51.65; H, 5.37; I, 2599. Found: C, 51.93; H, 5.68; I, 26.58.

In a similar manner, by substituting the 21-mesyloxy derivatives of 9α - chloro-$\Delta^{4,6}$-pregnadiene-11β,17α-diol-3,20-dione, 9α-fluoro-$\Delta^{4,6}$-pregnadiene-11β-ol-3,20-dione, 9α-chloro-$\Delta^{4,6}$-pregnadiene-11β-ol-3,20-dione, 9α - fluoro- $\Delta^{4,6}$-pregnadiene-17α-ol-3,11,20-trione, 9α - chloro - $\Delta^{4,6}$-pregnadiene-17α-ol-3,11,20-trione, 9α-fluoro-$\Delta^{4,6}$-pregnadiene-3,11,20-trione, and 9α-chloro-$\Delta^{4,6}$-pregnadiene-3,11,20-trione for the 9α-fluoro-$\Delta^{4,6}$-pregnadiene-11β,17α,21-triol-3,20-dione 21-mesylate of Example 8, the corresponding 21-iodo derivatives are produced.

Furthermore, the procedures of Examples 5 through 8 are also operative in the conversion of 9α-fluoro (or chloro)-$\Delta^1$-allopregnene-11β,17α,21-triol-3,20 - dione 21-mesylate, 9α-fluoro (or chloro)-$\Delta^1$-allopregnene-17α,21-diol-3,11,20-trione 21-mesylate, 9α-fluoro (or chloro)-$\Delta^1$-allopregnene-11β,21-diol-3,20-dione 21-mesylate, and 9α-fluoro (or chloro)-$\Delta^1$-allopregnene - 21 - ol - 3,11,20-trione 21-mesylate to their respective 21-iodides.

The following examples are directed to processes for preparing the 21-unsubstituted final products of this invention. As shown by these examples, the 21-unsubstituted products can be prepared either directly from the 21-mesylates of Examples 1 through 4 or from the 21-iodides of Examples 5 through 8.

EXAMPLE 9

9α-fluoro-11β,17α-dihydroxyprogesterone from 9α-fluorohydrocortisone 21-mesylate A solution of 180 mg. of 9α-fluorohydrocortisone 21-mesylate and 600 mg. of sodium iodide in 20 ml. of glacial acetic acid is refluxed for one hour. The mixture is concentrated to small volume and diluted with chloroform. The chloroform solution is washed with sodium sulfite solution, water, sodium bicarbonate solution and again with water. After drying over sodium sulfate the chloroform is evaporated in vacuo and the resulting crystalline residue consisting of 9α-fluoro-11β,17α-dihydroxyprogesterone is recrystallized from 95% ethanol. The analytically pure substance melts at about 274–276° and is identical in all respects with an authentic sample of 9α-fluoro-11β,17α-dihydroxyprogesterone.

*Analysis.*—Calcd. for $C_{21}H_{29}O_4F$ (364.44): C, 69.20; H, 8.02. Found: C, 69.22; H, 7.93.

EXAMPLE 10

9α-fluoro-11β,17-dihydroxyprogesterone from 9α-fluoro-21-iodo-$\Delta^4$-pregnene-11β,17α-diol-3,20-dione To a solution of 3.11 g. of 9α-fluoro-21-iodo-$\Delta^4$-pregnene-11β,17α-diol-3,20-dione in 31 ml. of dioxane is added 31 ml. of a 5% solution of sodium bisulfite in water. The resulting mixture is heated on the steam bath for 30 min. during which period the desired 9α-fluoro-11β,17α-dihydroxyprogesterone begins to crystallize. After cooling in the refrigerator the crystals amounting to about 2.1 g. or approximately 90% of theory are filtered off and washed thoroughly with water. The product obtained in this manner melts at about 275–277° and represents pure 9α-fluoro-11β,17α-dihydroxyprogesterone. An additional amount of material is recovered from the dioxane-water mother liquor.

EXAMPLE 11

9α-fluoro-11-keto-17α-hydroxyprogesterone from 9α-fluoro-21-iodo-$\Delta^4$-pregnene-17α-ol-3,11,20-trione A solution of 150 mg. of 9α-fluoro-21-iodo-$\Delta^4$-pregnene-17α-ol-3,11,20-trione and 500 mg. of sodium iodide in 15 ml. of glacial acetic acid is refluxed for one hour. The mixture is concentrated to small volume in vacuo, taken up in chloroform and extracted with sodium bisulfite solution, water, sodium bicarbonate solution and again with water. After drying over sodium sulfate the solvent is removed in vacuo and the resulting crystalline residue consisting of 9α-fluoro-17α-hydroxy-11-ketoprogesterone recrystallized from 95% ethanol. The resulting product is identical in all respects with an authentic sample.

9α-fluoro-17α-hydroxy-11-ketoprogesterone can also be obtained by reduction of the 21-iodo compound with sodium bisulfite in dioxane-water as described in Example 10 or by reduction of the 21-mesylate with sodium iodide in acetic acid as described in Example 9.

In the same manner, by substituting either the 21-mesylate of 9α-chlorohydrocortisone, 9α-fluorocorticosterone, 9α-chlorocorticosterone, 9α-fluoro-11-dehydrocorticosterone, 9α-chloro-11-dehydrocorticosterone, or 9α-chlorocortisone in the procedure of Example 9, or the 21-iodide of 9α-chloro-Δ⁴-pregnene-11β,17α-diol-3,20-dione, 9α-fluoro-Δ⁴-pregnene-11β-ol-3,20-dione, 9α-chloro-Δ⁴-pregnene-11β-ol-3,20-dione, 9α-fluoro-Δ⁴-pregnene-3,11,20-trione, 9α-chloro-Δ⁴-pregnene-3,11,20-trione, or 9α-chloro-Δ⁴-pregnene-17α-ol-3,11,20-trione in the procedure of Example 10 or 11, 9α-chloro-11β,17α-dihydroxyprogesterone, 9α-fluoro-11β-hydroxyprogesterone, 9α-chloro-11β-hydroxyprogesterone, 9α-fluoro-11-keto-progesterone, 9α-chloro-11-ketoprogesterone, and 9α-chloro-11-keto-17α-hydroxyprogesterone are prepared, respectively.

EXAMPLE 12

9α-fluoro-Δ¹,⁴-pregnadiene-11β,17α-diol-3,20-dione

A solution of 37.8 mg. of 9α-fluoro-21-iodo-Δ¹,⁴-pregnadiene-11β,17α-diol-3,20-dione in 1 ml. of purified dioxane and 1 ml. of 5% aqueous sodium bisulfite is refluxed on the steam bath for ½ hour, the resulting crystals are centrifuged off and washed with several portions of water. Recrystallization from 95% ethanol furnishes pure 9α-fluoro-Δ¹,⁴-pregnadiene-11β,17α-diol-3,20-dione possessing the following properties, M.P. about 313–315° (dec.); [α]$_D$ +47° (c., 0.20 in pyridine);

$\lambda_{max.}^{alc.}$ 238 mμ (ε=15,500); $\lambda_{max.}^{Nujol}$ 2.98μ (OH)

5.85μ (20-keto), 6.03μ, 6.20μ, 6.25μ (Δ¹,⁴-3-ketone).

Analysis.—Calcd. for $C_{21}H_{27}O_4F$ (362.42): C, 69.59; H, 7.50. Found: C, 69.47; H, 7.66.

9α-fluoro-Δ¹,⁴-pregnadiene-11β,17α-diol-3,20-dione can also be produced by treatment of the 21-mesylate with sodium iodide in acetic acid, according to the procedure of Example 9.

9α-fluoro-Δ¹,⁴-pregnadiene-11β,17α-diol-3,20-dione possesses about 4 times the activity of hydrocortisone in the rat liver glycogen assay.

In a similar manner, the 21-methanesulfonyloxy and 21-iodo derivatives of 9α-chloro-Δ¹,⁴-pregnadiene-11β,17α-diol-3,20-dione, 9α-fluoro-Δ¹,⁴-pregnadiene-11β-ol-3,20-dione, 9α-chloro-Δ¹,⁴-pregnadiene-11β-ol-3,20-dione, 9α-fluoro-Δ¹,⁴-pregnadiene-17α-ol-3,11,20-trione, 9α-chloro-Δ¹,⁴-pregnadiene-17α-ol-3,11,20-trione, 9α-fluoro-Δ¹,⁴-pregnadiene-3,11,20-trione, and 9α-chloro-Δ¹,⁴-pregnadiene-3,11,20-trione can be converted to 9α-chloro-Δ¹,⁴-pregnadiene-11β,17α-diol-3,20-dione, 9α-fluoro-Δ¹,⁴-pregnadiene-11β-ol-3,20-dione, 9α-chloro-Δ¹,⁴-pregnadiene-11β-ol-3,20-dione, 9α-fluoro-Δ¹,⁴-pregnadiene-17α-ol-3,11,20-trione, 9α-chloro-Δ¹,⁴-pregnadiene-17α-ol-3,11,20-trione, 9α-fluoro-Δ¹,⁴-pregnadiene-3,11,20-trione, and 9α-chloro-Δ¹,⁴-pregnadiene-3,11,20-trione, respectively.

EXAMPLE 13

9α-fluoro-Δ⁴,⁶-pregnadiene-11β-17α-diol-3,20-dione

To a solution of 140 mg. of 9α-fluoro-21-iodo-Δ⁴,⁶-pregnadiene-11β,17α-diol-3,20-dione in 1.4 ml. of pure dioxane is added 1.4 ml. of 5% aqueous sodium bisulfite solution. The mixture is heated on the steam bath for ½ hour and during this process crystals appear throughout the solution. After the addition of water, the mixture is cooled and the crystals of 9α-fluoro-Δ⁴,⁶-pregnadiene-11β,17α-diol-3,20-dione are filtered off and washed with water. Recrystallization of the crude crystals (about 92 mg.) from 95% ethanol furnishes the pure compound having the following properties: M.P. about 294–296° (dec.); [α]$_D^{23}$ +112° (c., 0.33 in dioxane);

$\lambda_{max.}^{alc.}$ 281 mμ (ε=26,000); $\lambda_{max.}^{Nujol}$ 2.99μ (OH)

5.87μ (20-keto), 6.10μ, 6.18μ, 6.30μ (Δ⁴,⁶-3-ketone).

Analysis.—Calcd. for $C_{21}H_{27}O_4F$ (362.43) C, 69.59; H, 7.51. Found: C, 69.66; H, 7.48.

In the same manner as Example 13 or in an analogous manner to Example 9, the 21-iodo and 21-methanesulfonyloxy derivatives of 9α-chloro-Δ⁴,⁶-pregnadiene-11β,17α-diol-3,20-dione,
9α-fluoro-Δ⁴,⁶-pregnadiene-11β-ol-3,20-dione,
9α-chloro-Δ⁴,⁶-pregnadiene-11β-ol-3,20-dione,
9α-fluoro-Δ⁴,⁶-pregnadiene-17α-ol-3,11,20-trione,
9α-chloro-Δ⁴,⁶-pregnadiene-17α-ol-3,11,20-trione,
9α-fluoro-Δ⁴,⁶-pregnadiene-3,11,20-trione, and
9α-chloro-Δ⁴,⁶-pregnadiene-3,11,20-trione, can be converted to their respective 21-unsubstituted derivatives.

Furthermore, the procedures of Examples 9 through 13 are also operative in the conversion of the 21-methanesulfonyloxy or 21-iodo derivatives of 9α-fluoro (or chloro)-Δ¹-allopregnene-11β,17α-diol-3,20-dione,
9α-fluoro (or chloro)-Δ¹-allopregnene-11β-ol-3,20-dione,
9α-fluoro (or chloro)-Δ¹-allopregnene-17α-ol-3,11,20-trione, and
9α-fluoro (or chloro)-Δ¹-allopregnene-3,11,20-trione to their corresponding 21-unsubstituted derivatives.

The invention may be otherwise embodied within the scope of the appended claims.

We claim:

1. 9α-halo-hydrocortisone 21-(lower alkane)sulfonate, wherein the halogen has an atomic weight greater than 18 and less than 36.

2. 9α-halo-cortisone 21-(lower alkane)sulfonate, wherein the halogen has an atomic weight greater than 18 and less than 36.

3. 9α-halo-Δ⁴,⁶-pregnadiene-11Δ,17α,21-triol-3,20-dione 21-(lower alkane)sulfonate, wherein the halogen has an atomic weight greater than 18 and less than 36.

4. 9α-halo-21-iodo-Δ⁴-pregnene-11β,17α-diol-3,20-dione, wherein the halogen has an atomic weight greater than 18 and less than 36.

5. 9α-halo-21-iodo-Δ⁴-pregnene-17α-ol-3,11,20-trione, wherein the halogen has an atomic weight greater than 18 and less than 36.

6. 9α-halo-21-iodo-Δ⁴,⁶-pregnadiene-11β,17α-diol-3,20-dione, wherein the halogen has an atomic weight greater than 18 and less than 36.

7. The process which comprises reacting a 21-alkanesulfonyloxy steroid of the pregnane series, having a 9α-substituent selected from the class consisting of fluoro and chloro, and an 11-substituent selected from the class consisting of β-hydroxy and keto, with a metal iodide in an acidic organic solvent, and recovering the 21-unsubstituted steroid thus produced.

8. The process which comprises reacting a steroid of the pregnane series, having a 9α-substituent selected from the class consisting of fluoro and chloro, an 11-substituent selected from the class consisting of β-hydroxy and keto, and a 21-substituent selected from the class consisting of alkanesulfonyloxy and iodo, with a reactant selected from the group consisting of a metal bisulfite, a metal iodide in an acidic solvent and an electropositive metal, and recovering the 21-unsubstituted steroid thus produced.

9. A compound selected from the group consisting of steroids of the general formulae

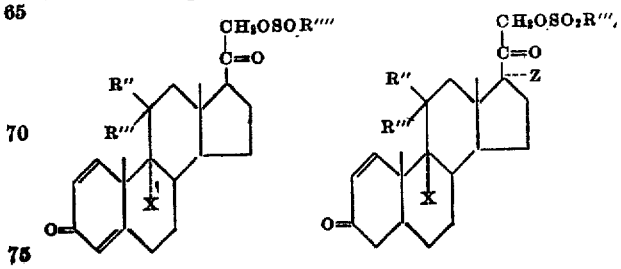

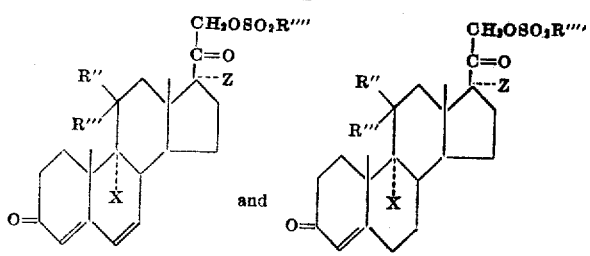

wherein R″ is hydrogen, R‴ is β-hydroxy and together R″ and R‴ is keto, X is selected from the group consisting of α-fluoro and α-chloro, Z is selected from the group consisting of hydrogen and α-hydroxy, and R″″ is lower alkyl.

10. A compound selected from the group consisting of steroids of the general formulae

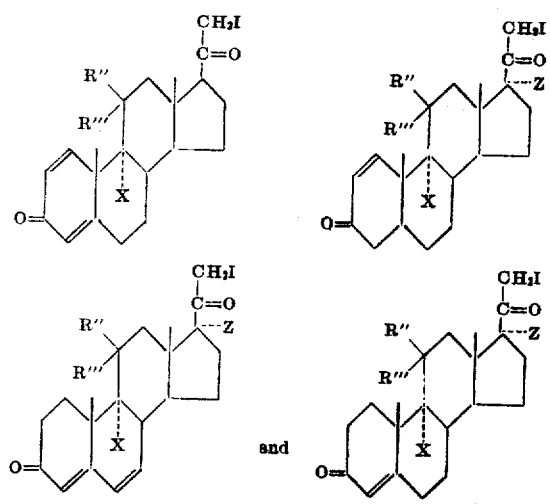

wherein R″ is hydrogen, R‴ is β-hydroxy and together R″ and R‴ is keto, X is selected from the group consisting of α-fluoro and α-chloro, and Z is selected from the group consisting of hydrogen and β-hydroxy.

11. 9α-fluorohydrocortisone 21-mesylate.
12. 9α-fluorocortisone 21-mesylate.
13. 9α-fluoro - $\Delta^{4,6}$ - pregnadiene-11β,17α,21-triol-3,20-dione 21-mesylate.
14. 9α-fluoro - 21 - iodo-$\Delta^4$-pregnene-11β,17α-diol-3,20-dione.
15. 9α - fluoro-21-iodo-$\Delta^4$-pregnene-17α-ol-3,11,20-trione.
16. 9α-fluoro - 21 - iodo-$\Delta^{4,6}$-pregnadiene-11β,17α-diol-3,20-dione.

References Cited in the file of this patent

UNITED STATES PATENTS

| | | |
|---|---|---|
| 2,183,589 | Reichstein | Dec. 19, 1939 |
| 2,703,799 | Bergstrom | Mar. 8, 1955 |
| 2,707,190 | Farrar | Apr. 26, 1955 |
| 2,713,587 | Bergstrom | July 19, 1955 |
| 2,736,681 | Tishler | Feb. 28, 1956 |
| 2,736,734 | Sarett | Feb. 28, 1956 |
| 2,763,671 | Fried et al. | Sept. 18, 1956 |
| 2,837,464 | Nobile | June 3, 1958 |
| 2,852,511 | Fried | Sept. 16, 1958 |
| 2,875,200 | Hogg et al. | Feb. 24, 1959 |
| 2,912,446 | Sarett | Nov. 10, 1959 |

OTHER REFERENCES

Fried et al., Jour. Am. Chem. Soc., 75, 2273 (1953).
Fried et al., Jour. Am. Chem. Soc., 76, 1455–1456 (1954).